US006992853B2

(12) United States Patent
Chang

(10) Patent No.: US 6,992,853 B2
(45) Date of Patent: Jan. 31, 2006

(54) METHOD AND APPARATUS FOR DETERMINING MODULATED, AMPLITUDE RAMPING RRO HARMONICS IN MULTI-SCREW CLAMPED HDD DISK/SPIND ASSEMBLY

(75) Inventor: Jen-Yuan Chang, San Jose, CA (US)

(73) Assignee: Hitachi Global Storage Technologies Netherlands B.V, Amsterdam (NL)

( * ) Notice: Subject to any disclaimer, the term of this patent is extended or adjusted under 35 U.S.C. 154(b) by 180 days.

(21) Appl. No.: 10/626,296

(22) Filed: Jul. 24, 2003

(65) Prior Publication Data

US 2005/0018344 A1   Jan. 27, 2005

(51) Int. Cl.
G11B 5/596   (2006.01)
(52) U.S. Cl. .................................. 360/77.02
(58) Field of Classification Search ............. 360/77.02, 360/73.02, 78.07, 99.08, 99.12; 700/279
See application file for complete search history.

(56) References Cited

U.S. PATENT DOCUMENTS

| | | | |
|---|---|---|---|
| 3,881,184 A | 4/1975 | Koepcke et al. .............. 360/78 |
| 5,365,458 A * | 11/1994 | Tamura et al. .............. 700/279 |
| 5,549,367 A | 8/1996 | Matsuto .................... 360/98.08 |
| 5,708,581 A | 1/1998 | Martinez .................... 364/164 |
| 5,867,340 A | 2/1999 | Morehouse et al. ...... 360/77.04 |
| 5,930,067 A | 7/1999 | Andrews et al. .......... 360/77.04 |
| 5,999,357 A * | 12/1999 | Serrano .................... 360/73.02 |
| 6,069,764 A | 5/2000 | Morris et al. ............. 360/77.04 |
| 6,141,175 A | 10/2000 | Nazarian et al. ......... 360/77.04 |
| 6,236,536 B1 * | 5/2001 | Ma et al. .................. 360/99.08 |
| 6,310,742 B1 | 10/2001 | Nazarian et al. ......... 360/77.04 |
| 6,456,452 B1 * | 9/2002 | Hobson et al. ........... 360/78.07 |
| 6,487,035 B1 | 11/2002 | Liu et al. .................. 360/77.04 |
| 6,549,362 B1 | 4/2003 | Melrose et al. ........... 360/77.04 |
| 6,785,090 B2 * | 8/2004 | Koyanagi et al. ........ 360/98.08 |
| 6,788,495 B2 * | 9/2004 | Aiello ...................... 360/99.12 |
| 2001/0043427 A1 | 11/2001 | Chen et al. ............... 360/77.04 |
| 2001/0043428 A1 | 11/2001 | Morris et al. ............. 360/77.04 |
| 2002/0071205 A1 | 6/2002 | Koyanagi et al. ........ 360/98.08 |

* cited by examiner

Primary Examiner—David Hudspeth
Assistant Examiner—Fred F. Tzeng
(74) Attorney, Agent, or Firm—John L. Rogitz

(57) ABSTRACT

A method for algorithmically determining, based on the number of screws used to hold the disks of a disk drive, harmonics of repeatable runout error during disk drive operation, such that correction of the error by feed forward techniques is facilitated.

15 Claims, 5 Drawing Sheets

Modulated Harmonics, m

| Physical wavenumber, n | 0 | 1 | 2 | 3 | 4 | 5 | 6 |
|---|---|---|---|---|---|---|---|
| 0 | ▨ |   |   | ▤ |   |   | ▤ |
| 1 |   | ▨ | ▤ |   | ▤ |   |   |
| 2 |   | ▤ | ▨ |   | ▤ |   |   |
| 3 | ▤ |   |   | ▨ |   |   | ▤ |
| 4 |   | ▤ |   |   | ▨ | ▤ |   |
| 5 |   | ▤ |   |   | ▤ | ▨ |   |
| 6 | ▤ |   |   | ▤ |   |   | ▨ |

▨ Base wavenumber of the annular plate
▤ Modulated harmonics due to presence of 3 screws

Figure 6

METHOD AND APPARATUS FOR DETERMINING MODULATED, AMPLITUDE RAMPING RRO HARMONICS IN MULTI-SCREW CLAMPED HDD DISK/SPIND ASSEMBLY

FIELD OF THE INVENTION

The present invention relates to correcting repeatable runout ("RRO") errors in hard disk drives.

BACKGROUND OF THE INVENTION

Disk files (or "drives") are information storage devices which utilize a rotatable disk with concentric data tracks containing the information, a head (or "transducer") for reading or writing data onto the various tracks, and an actuator connected to the head for moving it to the desired track and maintaining it over the track centerline during read or write operations the movement of the head to a desired track is referred to as track accessing or "seeking", while the maintaining of the head over the centerline of the desired track during read or write operations is referred to as track "following".

In disk files which have a relatively high density of data tracks on the disk, it is necessary to incorporate a servo control system to maintain the head precisely over the desired track during read or write operations. This is accomplished by utilizing prerecorded servo information either on a dedicated servo disk or on sectors angularly spaced and interspersed among the data on a data disk. During track following, the servo information sensed by the read/write head (or the dedicated servo head if a dedicated servo disk is used) is demodulated to generate a sampled position error signal (PES) which is an indication of the position error of the head away from the track centerline. The PES is used in the servo feedback loop to generate a control signal to the actuator to move the head back to the track centerline. A description of operation of a general disk file servo control system is given by R. K. Oswald in "Design of a Disk File Head-Positioning Servo", IBM Journal of Research and Development, November 1974, pp. 506–512.

There are several causes for the head being off the track centerline during track following and which thus contribute to the PES. Certain position error components are of a low frequency, that is of a frequency close to the frequency of rotation of the disk, and are repeatable with disk rotation. For example, if the disk is not precisely centered over the axis of rotation of the spindle motor, the circular tracks will have an eccentric shape relative to the axis of rotation. This will cause a repeatable disk "runout" error at the same frequency as the rotation of the disk. Similarly, even if the disk is precisely mounted about the spindle motor axis, but the spindle motor axis "wobbles" during rotation, this will also generate repeatable errors. The problem of repeatable error is magnified in disk files which have multiple disks since each disk, and indeed each disk surface, will have its own unique repeatable error signature.

As recognized herein, another factor giving rise to RRO error is disk perturbation caused by screws that fasten the disk to the rotating spindle. As further recognized herein, this problem is further magnified near the inner portions of the disk. If the repeatable errors are known, correction signals can be fed forward into the servo control system to account for them. The present invention provides a solution to determine repeatable errors in a disk drive so that appropriate correction signals can be fed forward into the servo control system.

SUMMARY OF THE INVENTION

A method is disclosed for determining harmonics of repeatable runout error during disk drive operation, such that correction of the error by feed forward techniques is facilitated. The method uses an algorithm to determine at least one harmonic ("m") based on a number ("NS") of disk fasteners. The output of the algorithm is used to establish a feed forward signal to a head positioning assembly to correct repeatable errors. The algorithm's predictions of RRO error harmonics caused by the fasteners can also be used in hard disk drive design.

The algorithm may be established at least in part by $n+m=NS, 2NS, 3NS, \ldots$, wherein n is a circumferential wave number resulting from disk physical deformation (disk warpage for instance), NS is the number of periodically-placed fasteners that are used to clamp the disk, and various values of m represent the numbers of present harmonics or wave numbers of disk deformation that are induced or modulated due to disk physical deformation at wave numbers n over NS periodically-spaced fasteners that hold the disk. Also, the algorithm may be established at least in part by the magnitude of $|n-m|=NS, 2NS, 3NS, \ldots$ In another aspect, a hard disk drive includes at least one disk susceptible to RRO error, at least one error correction circuit to cancel RRO error, and at least one input representing algorithmically determined RRO error based on a number of fasteners used to hold the disk.

In yet another aspect, a data storage system includes at least one disk, an integer number of screws holding the disk to a rotating component, and at least one head positioning assembly positioning a head over a disk. An error correction circuit controls the head positioning assembly in response to an error signal. As intended by the present invention, an error signal generation component generates the error signal at least in part based on the number of screws.

The details of the present invention, both as to its structure and operation, can best be understood in reference to the accompanying drawings, in which like reference numerals refer to like parts, and in which:

BRIEF DESCRIPTION OF THE DRAWINGS

FIG. 6 is a lookup table for modulated amplitude RRO error, in which NS=3.

DETAILED DESCRIPTION OF THE PREFERRED EMBODIMENT

Figure 1:
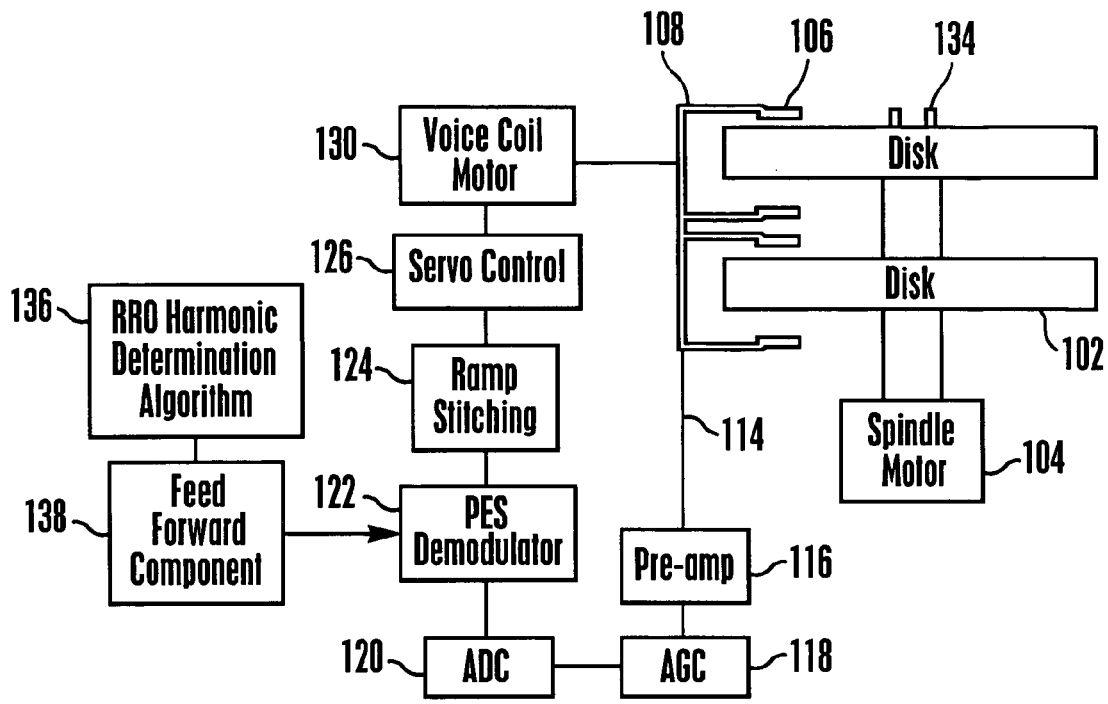
FIG. 1 is a block diagram of a disk drive in accordance with present principles.

Referring initially to FIG. 1, an exemplary non-limiting disk drive 100 is shown for illustration. Those skilled in the art will recognize that the exemplary components and structure illustrated in FIG. 1 are not intended to limit the present invention. Indeed, those skilled in the art will recognize that other alternative embodiments may be used without departing from the scope of the present invention.

The disk drive 100 stores information on the surfaces of one or more stacked disks 102 in the form of transitions or patterns formed on one or more data tracks. The disks 102 are rotatably mounted on a spindle motor 104. Transitions are sensed or "read" from the disk 102 surfaces via one or more transducers 106, known as read/write heads, supported in close proximity to the disk 102 surfaces by a head positioning assembly 108, wherein the transducers 106 convert the transitions into electrical signals. The head positioning assembly 108 positions the transducers 106 over the disk 102 surfaces in a linear or rotary manner by operation of a voice coil motor (VCM) 130, which is controlled by a servo control loop that includes a servo controller 126.

The read/write heads 106, in addition to providing data read from the disk 102 surfaces, provide servo information from the disk 102 surfaces as a signal on line 114. A preamplifier (PRE-AMP) 116 receives and amplifies the servo information signal and provides the amplified signal to an automatic gain control (AGC) 118 that adjusts the gain applied to the signal to maintain the signal amplitude within a range that is predetermined to simplify information processing, reduce noise, and improve linearity. The amplified signal from the AGC 118 is provided to an analog-to-digital converter (ADC) 120 that asynchronously converts the signal.

The digitized servo information signal is provided to a PES demodulator (PES DEMOD) 122, which demodulates it into a position error signal (PES). A ramp stitching block 124 can be provided to form a substantially linear PES for each track on the disk 102. If desired, the PES can be further linearized by the servo controller 126. The servo controller 126 then uses the PES to generate the control signals to the VCM 130 to move the head positioning assembly 108 and read/write heads 106.

As shown in FIG. 1, plural fasteners such as screws 134 can hold the disks 102 in engagement with the spindle motor 104. In accordance with the present invention, the integer number of screws ("NS") can be used by a RRO harmonic determination algorithm component 136 to determine harmonics of RRO error and to provide an output to a feed forward component 138, which in turn can provide error correction input (such as the inverse of the data received from the component 136) to, e.g., the PES demodulator 122 or other component to correct for the errors by canceling the errors. One or both of the components 136, 138 may be implemented by a general purpose processor or other appropriate device or devices that function in accordance with the logic below.

Figure 2:
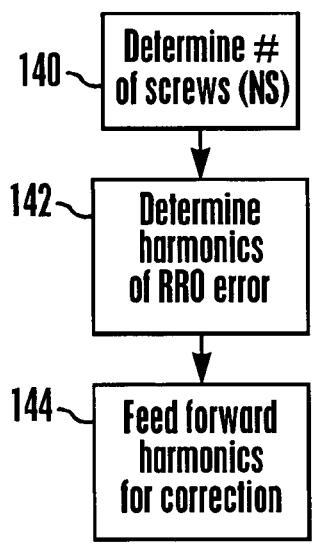
FIG. 2 is a flow chart of the present logic.

Specifically, now referring to FIG. 2, at block 140 the number of screws 134 used in the disk drive to hold the disks 102 is obtained. For instance, three screws might be used, in which case NS=3.

Moving to block 142, harmonics of RRO error for which feed forward error correction is necessary are determined based on NS. The fourth and fifth harmonics, for instance, can be obtained. These harmonics are obtained algorithmically. More specifically, the harmonics are determined by solving for "m" using the equations:

$$n+m=NS, 2NS, 3NS, \ldots,$$

wherein n is a wave number, m is the number of harmonics, and NS is the number of fasteners.

And/or, the following equation can be used:

$$|n-m|=NS, 2NS, 3NS, \ldots$$

At block 144, the results of the algorithm are fed forward to the error correction system shown in FIG. 1 as appropriate to correct for (by canceling) RRO error using the appropriate harmonics in the equations below. Or, the results can be used to better design the disk mechanical design, e.g., by establishing a number of screws to minimize RRO error.

Figure 3A:
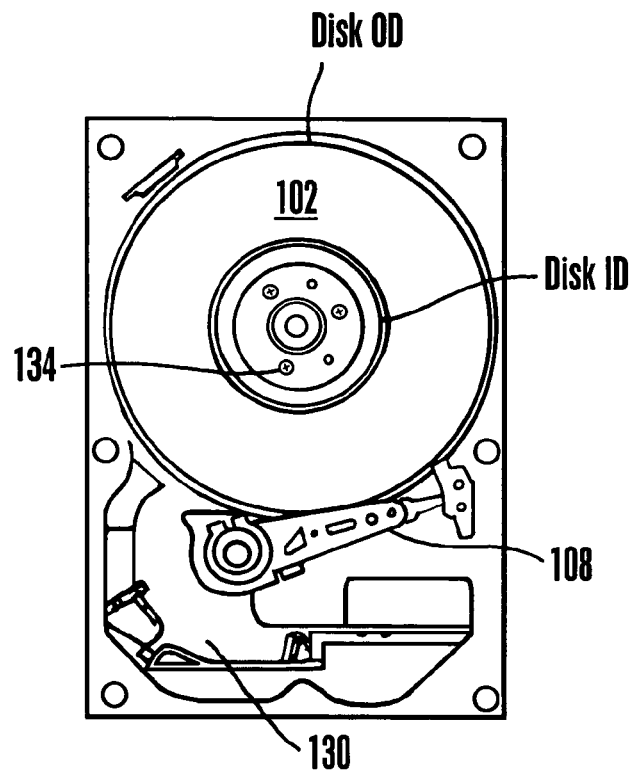
FIG. 3 is a graph of a typical disk drive with measured disk flatness, showing that the disk deforms in a shape of a potato chip, which indicates the wave number n=2, the second harmonic.
Figure 3B:
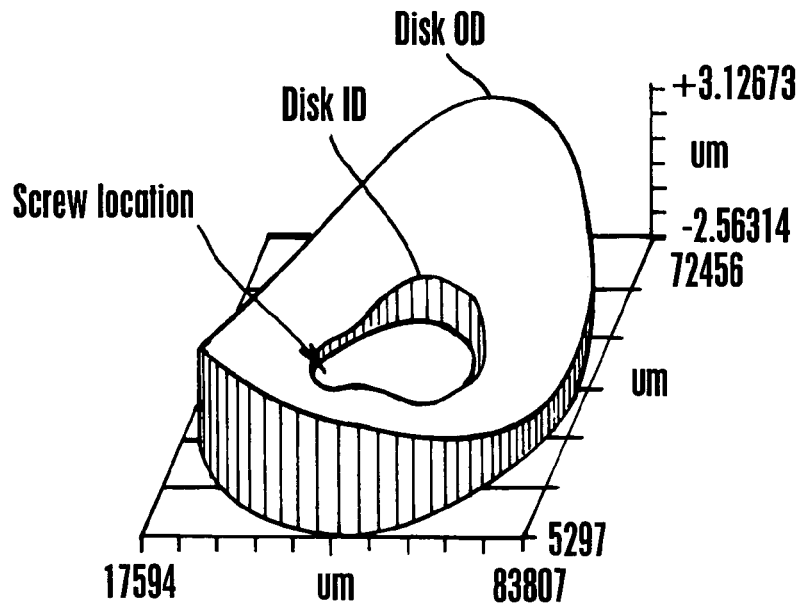

A typical disk drive having three (NS=3) circumferentially and evenly placed screws and other components such as voice coil motor 130 and head positioning assembly 108 is shown in FIG. 3(a). Given that no uniform and isotropic disks can be obtained in real disks of data storage devices, a deformation phenomenon twice around, i.e., the so-called potato-chipping phenomenon, is that the disk deforms like a potato chip. This is usually observed in disk data storage systems. This deformation is identified to be the primary physical driving mechanism in creating the wave number n in the previously described equations. The measured disk flatness of the disk in FIG. 3(a) is shown in FIG. 3(b) providing a physical illustration of how a disk deforms like a potato chip, which is caused mainly from non-uniform material distribution during disk manufacturing and disk/spindle thermal radial expansion mismatch during disk drive operation.

Figure 4A:
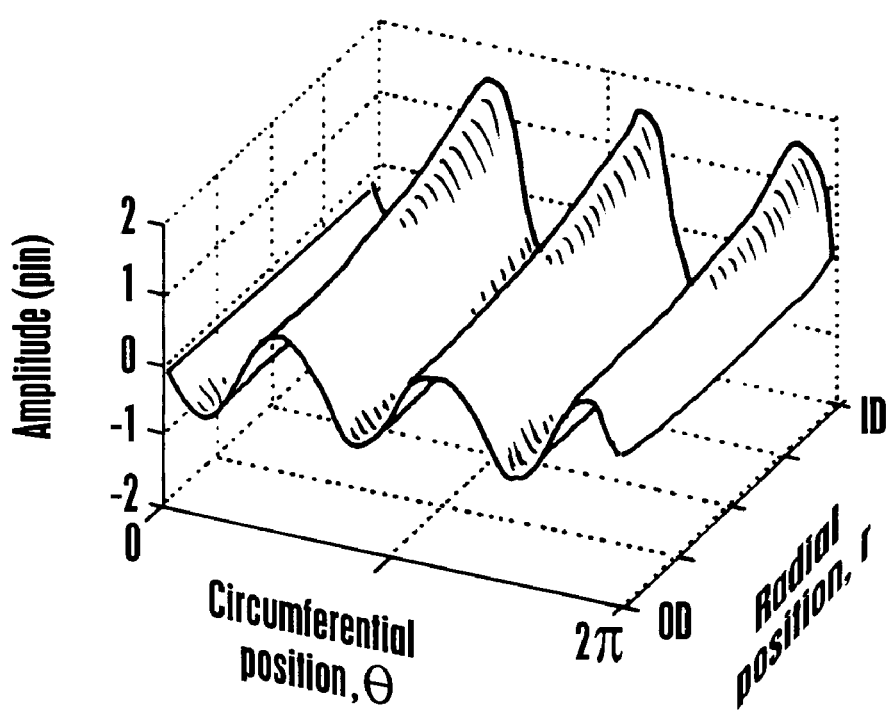
FIG. 4 is a graph of the third and second harmonics of fastener- and disk/spindle thermal expansion mismatch-induced RRO error, in which NS=3 and n=2.

Due to the disk fasteners such as screws, the RRO error measured by read/write heads at the disk ID position as depicted in FIG. 3(a) contains a primary or major harmonic component at NS. FIG. 4(a) shows an example of the third harmonic of servo observed/measured RRO error caused by NS=3 screws having its amplitude decaying from disk ID to OD position. The disk warpage profile resulting from periodic, plural disk fasteners can be best described by the following equation:

$$U_{NS}(r, \theta)=T \times R_{NS}(r) \times [\cos(NS\ \theta)+\sin(NS\ \theta)], \text{ where}$$

r represents the position of the read/write head on disk's surface ranging from disk's OD to ID radial position as respect to disk center, θ represents the position of the read/write head on disk's circumferential position, T is a scaling factor relating to the averaged torque applied at each fastener, and $R_{NS}(r)$ represents amplitude of the NS-th harmonic of RRO error from disk OD to ID due to the fasteners, with the identity ("m") of each present harmonic being determined from the first two equations above. It is usually represented by a quadratic ($2^{nd}$ order) polynomial equation: $R_{NS}(r)=p_2 \times r^2+p_1 \times r+p_0$, where $p_0$, $p_1$, and $p_2$ are coefficients that depend on the particular dimension of the disk and other track-following servo control parameters. When the fasteners are placed near the disk ID region, RNS has the highest value and decays in a quadratic order toward the disk OD region.

Figure 4B:
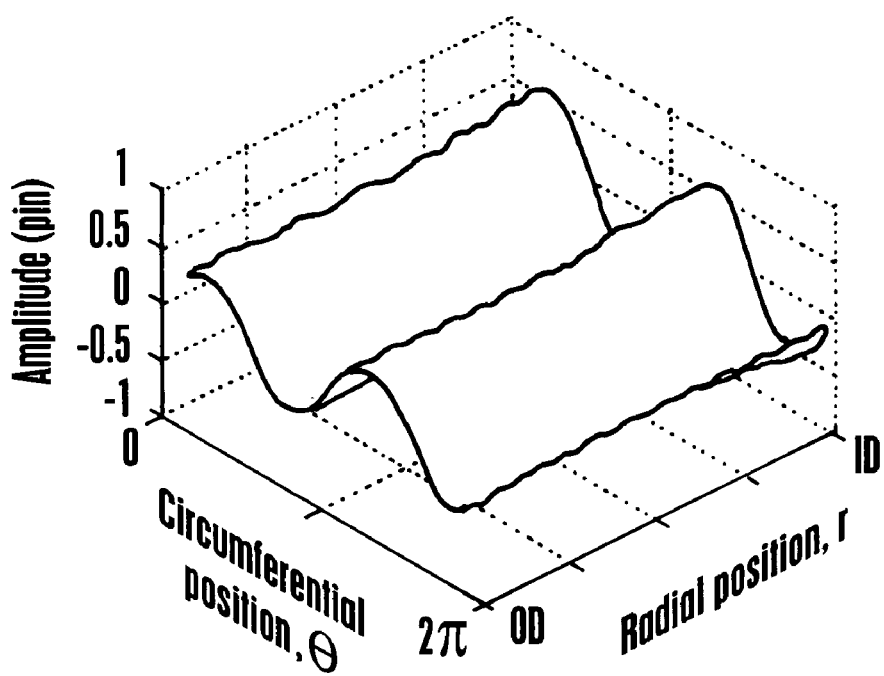

In FIG. 4(b), a second harmonic of the same RRO error is shown, in which case, uniform amplitude distribution from OD to ID as opposed to that in FIG. 4(a) is illustrated.

Its profile can then be described by the following equation with n=2:

$$U_n(\theta) = R_n \times [\cos(n\,\theta) + \sin(n\,\theta)], \text{ where}$$

θ represents the position of the read/write head on the disk's circumferential position, and $R_n$ represents the uniform amplitude of the n-th harmonic of RRO error from disk OD to ID in the absence of fasteners.

Figure 5A:
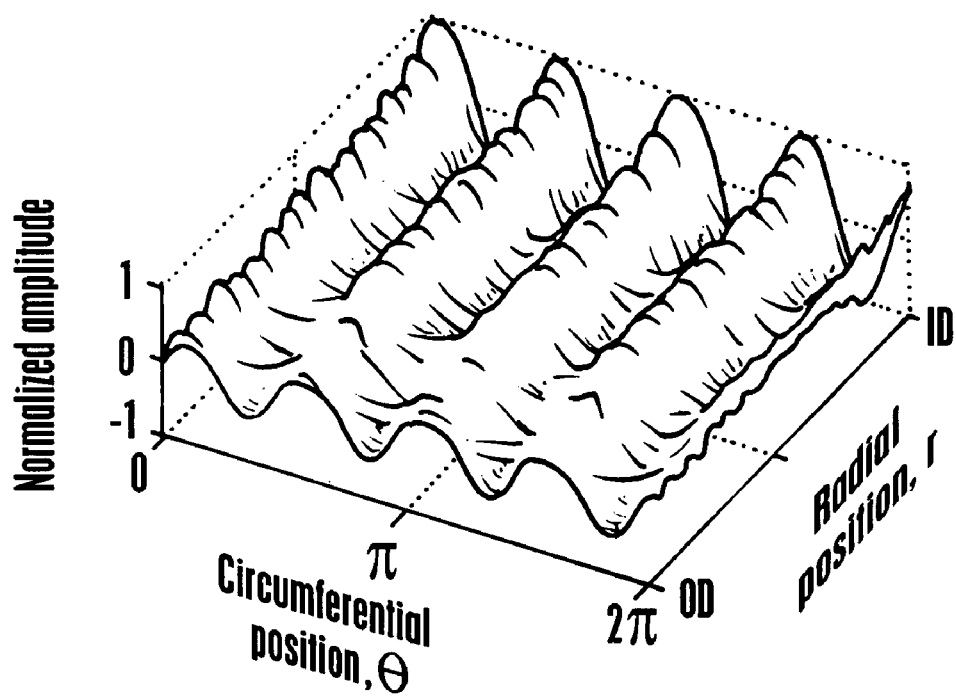
FIG. 5 is a graph of the fourth and fifth harmonics of fastener-induced RRO error, showing the higher error amplitudes near the inner portion of the disk.
Figure 5B:
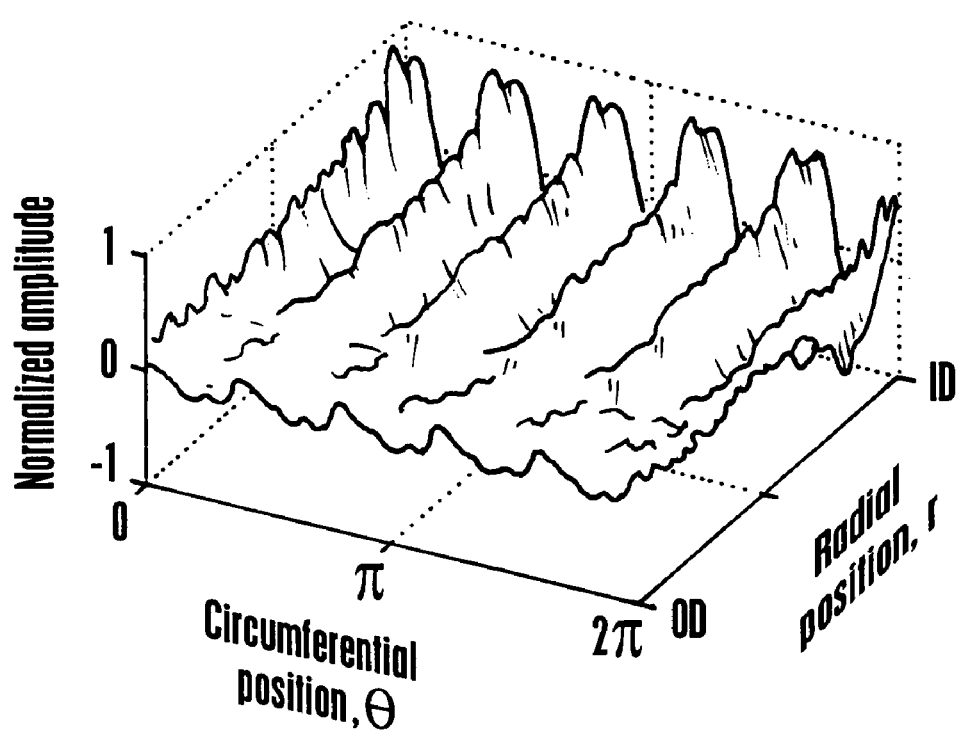

In both cases and in what are shown in FIG. 5, a Fourier transformation is applied to servo observed RRO error of tracks from disk OD to ID using the harmonic profiles shown and described, once the numeric identities ("m") of the harmonics have been identified using, e.g., the first two equations above. In other words, the RRO error of each track can be described by the following equation in Fourier terms:

$$RRO(r, \theta) = U_n(\theta) + U_{NS}(r, \theta) + \sum_m Um(r, \theta) + U_{other}(r, \theta),$$

where $U_{other}(r, \theta)$ represents other higher-order harmonics of track-following RRO error resulting from motor-related harmonics or other disk drive dynamic issues that are not the main focus of the present invention, and $$\sum_m Um(r, \theta)$$

is the profile of RRO error component that combines at least one harmonic m due to the effect of the fasteners or screws and resulting disk warpage with wave number n which will be explained and illustrated with examples in the following materials.

As the function of the fasteners used in disk data storage devices is to hold the disk on to the rotating spindle motor component, one can view the disks being constrained to the rotating spindle by the fasteners having stronger effect near disk ID region as compared to OD region described by equation of $U_{NS}(r, \theta)$. However, disks inevitably have to deform in a shape as profiled by the equation of $U_n(\theta)$ with certain circumferential wave number n; in normal conditions, n=2. While a disk of a data storage device is deforming at wave number n=2, for instance in the illustrated example, at the same time, NS=3 periodically-placed fasteners near the disk ID region are trying to hold the disk, extra wave numbers or harmonics m are induced so as to balance disk strain energy to maintain both NS=3 and n=2 harmonic profiles. These "extra" harmonics m satisfy the previously described key algorithm of this invention:

|n−m|=NS, 2NS, 3NS, . . . and/or n+m=NS, 2NS, 3NS, . . .

With more specificity to illustrate with NS=3 and n=2, FIG. 5 shows at (a) the fourth harmonic of fastener-induced RRO error, and at (b) the fifth harmonic of fastener-induced RRO error. As shown, the amplitudes are higher near the center of the disk, which profile can be described by the following equation:

$$U_m(r, \theta) = T \times R_m(r) \times [\cos(m\,\theta) + \sin(m\,\theta)], \text{ where}$$

r represents the radial position of the read/write head on the disk's surface ranging from disk's OD to ID radial position, θ represents the angular position of the read/write head on the disk's circumferential position, T is a scaling factor relating to the averaged torque applied at each fastener, and $R_m(r)$ represents the amplitude of the m-th harmonic of RRO error from disk OD to ID, with m satisfying:

|n−m|=NS, 2NS, 3NS, . . . , and/or n+m=NS, 2NS, 3NS, . . .

$R_m(r)$ is a quadratic ($2^{nd}$ order) polynomial function of disk radial position, r, written as $R_m(r) = q_2 \times r^2 + q_1 \times r + q_0$, where $q_0$, $q_1$, and $q_2$ are coefficients that depend on the particular harmonic m, dimensions of the disk, and track-following servo control amplification and/or attenuation designs. In general, $R_m(r)$ behaves the same way as $R_{NS}(r)$, having a higher value at disk ID than at the OD position. Since $U_m(r, \theta)$ also depends on T, the torque applied at each periodically-placed fastener, the higher the torque applied at each screw/fastener during the disk drive manufacturing process, the higher the servo observed/measured RRO error with major harmonics at m as well as at NS can be observed which significantly degrades disk drive performance near the disk ID region.

FIG. 6 illustrates a lookup table that can be generated by the algorithm above to look up modulated, amplitude RRO error harmonics when the number of screws (NS) is 3. When a table is generated using the algorithm and then used to look up the harmonics that must be corrected for, as intended by the present invention the RRO error is determined based on the algorithm, if indirectly by means of the table. Substituting n with 2, the wave number caused by disk deformation, in the previously described equations: |2±m|=NS, 2NS, 3NS, . . . , the modulated, fastener-induced harmonics of RRO error can then be determined to be at m=1, 4, 5, . . . as indicated by the gray boxes in FIG. 6. When n=1, that is the disk slips in the radial direction as respect to the rotating spindle, the gray boxes in the row of n=1 shown in FIG. 6 indicate modulated, fastener-induced harmonics of m=2, 4, 5, . . . are present and must be corrected for using the above Fourier equation(s), but, for instance, the third harmonic is not present and, thus, need not be corrected for. Thus, the skilled artisan can use those harmonics marked in gray and black boxes as illustrated using NS=3 in FIG. 6 in combination with one or more of the above equations to feed forward RRO information to correct RRO errors and to improve performance.

As previously disclosed, the amplitude profile of $U_n(\theta)$ caused by disk physical deformation in wave number n, is uniform and is not a function of the radial position from disk OD to ID while that of $U_m(r, \theta)$ is a quadratic polynomial function of radial position increasing from OD to ID. With this in mind, the skilled artisan can feed forward the above-disclosed amplitude characteristics of RRO error components $U_n(\theta)$, and $U_m(r, \theta)$ in generating RRO feed forward signals as a function of read/write head position over disk surfaces. Further, if desired a lookup table similar to the one shown in FIG. 6 can be constructed depending on NS, to be used in the above-disclosed feed forward operation.

The algorithm disclosed in the invention is not limited to wave numbers of two and below (n=1, 2) but also applies to higher order disk deformation cases, such as n≧3 cases. In the case when the fasteners are not evenly spaced near the center of disk, an a-periodic clamping stress distribution is observed in the disk inner diameter (ID) region as opposed to the periodic one shown in FIG. 3(a). In this case, a combination of multiple NS cases and Fourier combinations of multiple wave numbers can be used to represent the a-periodic distribution near the disk ID to feed forward the Fourier output to cancel RRO. The present logic disclosed in this invention also applies to each subset of multiple NS so as to determine the modulated or fastener-induced harmonics of RRO error in the feed forward cancellation process.

While the particular METHOD AND APPARATUS FOR DETERMINING MODULATED, AMPLITUDE RAMPING RRO HARMONICS IN MULTI-SCREW CLAMPED HDD DISK/SPINDLE ASSEMBLY as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act". Absent express definitions herein, claim terms are to be given all ordinary and accustomed meanings that are not irreconcilable with the present specification and file history.

What is claimed is:

1. A method for determining harmonics of repeatable runout error during disk drive operation, such that correction of the error by feed forward techniques is facilitated, comprising:
    using at least one algorithm to determine at least one RRO error harmonic based on a number of disk fasteners.

2. The method of claim 1, further comprising using an output of the algorithm to establish a feed forward signal to a head positioning assembly to correct repeatable errors.

3. The method of claim 2, wherein the algorithm is established at least in part by n+m=NS, 2NS, 3NS, ..., wherein NS is the number of periodically-spaced fasteners, n is a wave number of disk deformation, and m is a harmonic number induced by the NS fasteners to cause the disk to deform with wave number equal to n.

4. The method of claim 2, wherein the algorithm is established at least in part by the magnitude of |n−m|=NS, 2NS, 3NS, ..., wherein NS is the number of periodically-spaced fasteners; n is a wave number of disk deformation, and m is a harmonic number induced by the NS fasteners to cause the disk to deform with wave number equal to n.

5. A hard disk drive, comprising:
    at least one disk susceptible to RRO error;
    at least one error correction circuit to cancel RRO error; and
    at least one input representing algorithmically determined RRO error harmonics based on a number of fasteners used to hold the disk.

6. The disk drive of claim 5, wherein the fasteners hold the disk to a spindle.

7. The disk drive of claim 5, wherein the RRO error is determined by an algorithm established at least in part by n+m=NS, 2NS, 3NS, ..., wherein n is a wave number, m is a harmonic number, and NS is the number of fasteners.

8. The disk drive of claim 5, wherein the RRO error is determined by an algorithm established at least in part by the magnitude of |n−m|=NS, 2NS, 3NS, ..., wherein n is a wave number, m is a harmonic number, and NS is the number of fasteners.

9. A system, comprising:
    at least one disk;
    an integer number of screws holding the disk to a rotating component;
    at least one head positioning assembly positioning a head over a disk;
    at least one error correction circuit controlling the head positioning assembly in response to an error signal; and
    at least one error signal generation component generating the error signal at least in part based on the number of screws.

10. The system of claim 9, wherein the error signal generation component uses at least one algorithm to generate the error signal, the error signal being an RRO error signal.

11. The system of claim 10, wherein the RRO error signal is determined by an algorithm established at least in part by n+m=NS, 2NS, 3NS, ..., wherein n is a wave number, m is a harmonic number, and NS is the number of fasteners.

12. The system of claim 10, wherein the RRO error signal is determined by an algorithm established at least in part by the magnitude of |n−m|=NS, 2NS, 3NS, ..., wherein n is a wave number, m is a harmonic number, and NS is the number of fasteners.

13. A data storage system, comprising:
    means for determining harmonics of repeatable runout (RRO) error during disk drive operation to generate an error signal based on a number of disk fasteners; and
    means for feeding forward the error signal to cancel the RRO error.

14. The system of claim 13, wherein the means for determining at least in part uses n+m=NS, 2NS, 3NS, ..., wherein n is a wave number, m is a harmonic number, and NS is the number of fasteners.

15. The system of claim 13, wherein the means for determining at least in part uses the magnitude of |n−m|=NS, 2NS, 3NS, ..., wherein n is a wave number, m is a harmonic number, and NS is the number of fasteners.

* * * * *